United States Patent Office 3,290,378
Patented Dec. 6, 1966

3,290,378
STABILIZATION OF GLYOXAL
Kaname Tsunemitsu, 246 Shoraiso, Nishinomiya, Japan, and Yoshiaki Tsujino, 58 3-chome, Nishizaki-cho, Ogaki, Japan
No Drawing. Filed Jan. 2, 1963, Ser. No. 248,887
3 Claims. (Cl. 260—601)

The invention relates to the stabilization of glyoxal, more particularly relates to a method of preparing the stabilized glyoxal.

It is well known that glyoxal which is the most simple aliphatic dialdehyde and applicable for various uses, may be produced by oxidizing such organic compounds as acetylene, ethylene, acetaldehyde, paraldehyde or ethylene glycol with an oxidizing agent such as oxygen, nitric acid, selenium dioxide, etc.

In most cases, however, thus produced glyoxal or the solution thereof is not fully stable for ageing, and it shows tendency toward yellowish or brownish coloration upon standing for long period at room temperature and, particularly, when heated.

An object of the present invention is to provide a method for preparing the stabilized glyoxal for ageing.

Another object of the present invention is to provide a method for preparing glyoxal of the increased stability against the undesirable coloration caused during the period of storage, shipping or, particularly, any treatments carried out at an elevated temperature.

Other objects of the present invention will be apparent from the following description and claims.

It has now been found that the above objects may be attained in accordance with the present invention by treating the solution of glyoxal with a cation exchanger.

According to the present invention, therefore, a process for preparing the stabilized glyoxal comprises treating the solution of glyoxal with a cation exchanger.

The precise mechanism by which the cation exchanger is effectively employed for the stabilization of glyoxal in the present invention is not fully understood. From such facts as described above, however, it may be presumed that any impurities contained in the reaction product, probably any metal cations may cause or accelerate the coloration of glyoxal, and they may be removed by treating with the cation exchanger. It is, therefore, also desirable for the objects of the present invention to employ raw materials freed from metal cations for the production of glyoxal.

In carrying out the method of the present invention, the reaction mixture containing glyoxal obtained by the oxidation of such organic compounds as unsaturated hydrocarbons, aldehydes or alkylene glycols is passed through the layer of the cation exchanger immediately or after said reaction mixture is concentrated and/or treated with an anion exchanger to remove some organic acids which are formed as by-product and the residue of the employed oxidizing agent such as nitric acid. As said cation exchanger, there may be preferably employed any of the various kinds of commercially available cation exchange resin sold under the trade name "Dowex" (Dow Chemical Co.), "Amberlite" (Rohm & Haas Co.), "Diaion" (Mitsubishi Chemical Industries, Ltd.), etc.

According to the present invention, glyoxal of commercial value for its stability against coloration may be obtained, and there may be eliminated any troubles caused by the coloration of glyoxal or the solution thereof during the long period of storage or shipping and even when heated.

The present invention is illustrated by the following example on the case that glyoxal is produced by the oxidation of acetaldehyde employed nitric acid as an oxidizing agent. The example is intended as explanatory only and not as limiting to the scope of the invention. Parts and percentages specified are by weight.

EXAMPLE

Manufacture of glyoxal

There was employed the apparatus consisting of a series of reactors provided with reflux condensers and agitators. As raw materials, refined acetaldehyde and refined nitric acid were diluted by water treated with a cation exchanger to 50% and 40% in concentration, respectively. Thus prepared aqueous solution of acetaldehyde and dilute nitric acid were continuously charged with agitation in the molar ratio of about 2.5 to 1 into the first reactor from near the top thereof, and were continuously transferred from the bottom of the first reactor into near the top of the second reactor, and then were discharged from the bottom of the latter. As initiator, a small amount of nitric oxide was added into the first reactor only at an early stage of the reaction. Each reactor was maintained at a temperature of 38° to 39° C. The feed rate of the raw materials was controlled so that the average residence time of the reaction mixture in each reactor was maintained for about 3 hours. From the feed of 11.1 parts by net weight of acetaldehyde and 6.74 parts by net weight of nitric acid, 39.2 parts of the aqueous mixture containing 9.1% of glyoxal, 6.3% of some organic acids yielded as by-product, 1,4% of unchanged nitric acid and 16.5% of unchanged acetaldehyde were obtained.

Purification

Said aqueous mixture was concentrated at 50° C. under the subatmospheric pressure of 50 mm. Hg till the concentration of nitric acid reached up to about 5%, and was furthermore heated at 50° C. for 2 hours after 0.6 part of acetaldehyde was added therein to consume the remained nitric acid. Then the mixture was passed through the column packed with anion exchanger to remove the organic acids after volatile matters such as acetaldehyde were distilled off. There were obtained 8.9 parts of aqueous solution containing about 40% of glyoxal and less than about 0.8% of organic acids.

Treatment with cation exchanger

Said aqueous solution of glyoxal was passed through the column packed with 0.6 part of the cation exchange resin of free acid type, and then was standing on shelf at a temperature of 35 to 40° C. for long period. Even after two months, any coloration of the solution was not observed at all.

On the contrary, while the aqueous solution of glyoxal was prepared in the same manner as described above with the exception that crude nitric acid and non-refined water were employed as raw materials and the resulted solution of glyoxal was not treated with cation exchanger, it was found that said solution became markedly yellowish brown after only two weeks,

What we claim is:
1. Method of preparing a stabilized glyoxal which comprises bringing an aqueous solution of glyoxal into contact with a cation exchanger in hydrogen form, said glyoxal having been formed by the oxidation of (1) a member selected from the group consisting of acetylene, ethylene, acetaldehyde, paraldehyde and ethylene glycol with (2) a member selected from the group consisting of oxygen, nitric acid and selenium dioxide.

2. Method in accordance with claim 1, wherein the starting materials for formation of the glyoxal are preliminarily stripped of metal cations.

3. Method in accordance with claim 1, wherein an initially produced dilute solution of glyoxal is concentrated prior to contacting with the cation exchanger.

References Cited by the Examiner

UNITED STATES PATENTS

| | | | |
|---|---|---|---|
| 2,599,335 | 6/1962 | Lehmann et al. | 260—601 |
| 2,664,396 | 12/1953 | Riley | 260—601 |
| 3,079,985 | 3/1963 | Boehme et al. | 260—601 X |

OTHER REFERENCES

Cristy et al.: Chemical Engineering progress, vol. 44 (1948), pages 417–420.

LEON ZITVER, *Primary Examiner.*

J. J. SETELIK, B. HELFIN, *Assistant Examiners.*